(12) United States Patent
Kawai et al.

(10) Patent No.: US 6,430,998 B2
(45) Date of Patent: Aug. 13, 2002

(54) RESONANT ELEMENT

(75) Inventors: Hiroshi Kawai, Yokohama; Kuniki Ohwada, Hachioji, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/727,087

(22) Filed: Nov. 30, 2000

(30) Foreign Application Priority Data

Dec. 3, 1999 (JP) ............................................. 11-344648

(51) Int. Cl.[7] .............................................. G01C 19/00
(52) U.S. Cl. .................................. 73/504.12; 73/514.18
(58) Field of Search ......................... 73/504.12, 504.14, 73/504.02, 504.03, 504.04, 514.15, 514.17, 514.18, 514.29

(56) References Cited

U.S. PATENT DOCUMENTS 6,240,780 B1 * 6/2001 Negoro et al. ........... 73/504.12

OTHER PUBLICATIONS

William A. Clark, et al. "Surface Micromachined Z–Axis Vibratory Rate Gyroscope", *Solid–State Sensor and Actuator Workshop*, Jun. 2–6, 1996, pp. 283–287.

* cited by examiner

*Primary Examiner*—Richard A. Moller
(74) *Attorney, Agent, or Firm*—Ostrolenk, Faber, Gerb & Soffen, LLP

(57) ABSTRACT

A resonant element includes: a fixed substrate having a main surface in orthogonal X- and Z-directions; a planar vibrating body fixed via support beams so as to be vibratable in an X-direction, the planar vibrating body having a weight portion which is isolated from the fixed substrate; an exciter for vibrating the planar vibrating body in the X-direction, and means for adjusting the resonance frequency of said planar vibrating body by providing electrostatic forces to said planar vibrating body, and for correcting the tilt of said planar vibrating body with respect to the substrate plane direction of said fixed substrate, the tilt correcting means being provided at least opposing edge areas of said planar vibrating body with a gap therebetween in the X-direction, on the plane side and spaced from said planar vibrating body in a Y-direction orthogonal to the X- and Z-directions.

13 Claims, 7 Drawing Sheets

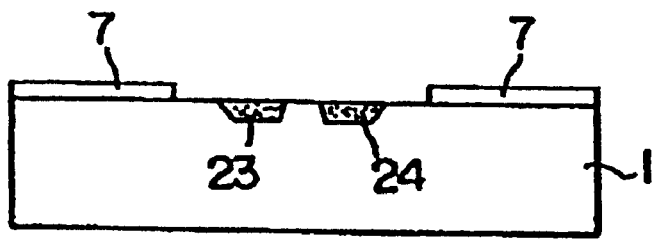
FIG. 2A
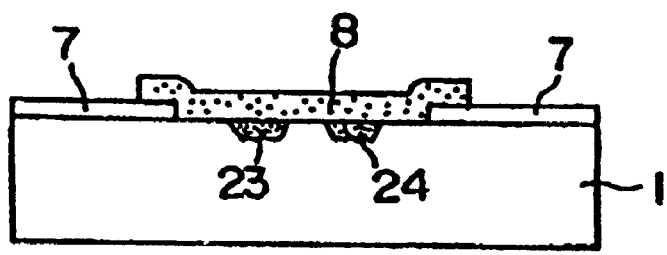
FIG. 2B
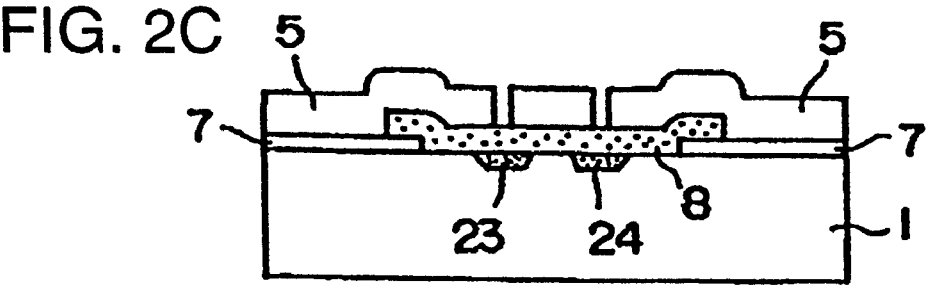
FIG. 2C
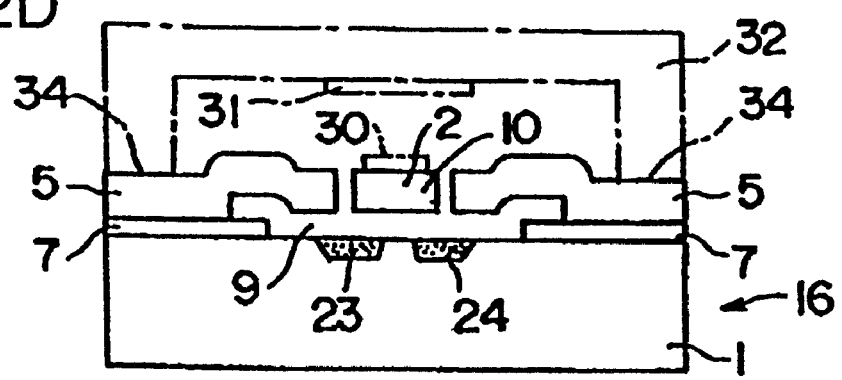
FIG. 2D
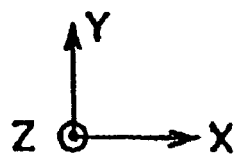

RESONANT ELEMENT

BACKGROUND OF THE INVENTION

1. Field of the Invention

The present invention relates to a resonant element used as an angular velocity sensor, filter, or the like.

2. Description of the Related Art

FIG. 7A is a perspective view showing a previous resonant element 16. The resonant element 16 is a microelement produced utilizing a conventional silicon micromachining technique and the like. More specifically, the resonant element 16 is produced by forming a nitride film 7 on a silicon substrate 1, then forming a polysilicon film 5 thereover, and forming the films 7 and 5 into a predetermined pattern by dry etching or the like.

The substrate 1 functions as a fixed substrate of which the substrate plane direction is an X-Z two-dimensional plane direction. A weight portion 2 is disposed above the substrate in a state isolated from the substrate 1. In the resonant element 16 shown in FIG. 7A, the weight portion functions as a planar vibrating body 10. The planar vibrating body 10 is supported via support beams 3 so as to be vibratable in the X-direction. One end side of each of the support beams 3 is fixed to the substrate I via a fixing portion 35.

Comb electrodes 6B are formed on both sides of the planar vibrating body 10 outwardly in the transverse direction (X-direction), and comb electrodes 6A are each disposed inwardly in the transverse direction at positions opposed to and interdigitated with the comb electrodes 6B. Conductive layers for driving 11A and 11B are connected to the comb electrodes 6A and 6B, respectively, and are connected with outside electrode pads (not shown) via conductor patterns (not shown), and thus form an exciter 4.

Once an AC voltage is applied to these conductive layers for driving 11A and 11B of the exciter 4, an electrostatic force is generated between the comb electrodes 6A and 6B, and the planar vibrating body 10 is vibrated in the arrow F direction (X-direction) by this electrostatic force.

When the resonant element 16 is rotated around the Z-axis while the planar vibrating body 10 is vibrated in the X-direction by driving the comb electrodes 6A and 6B, a Coriolis force occurs in the Y direction orthogonal to the above-described X-Z two-dimensional plane direction. The Coriolis force is applied to the planar vibrating body 10 constituted of the weight portion 2, and the planar vibrating body 10 vibrates in the direction of the Coriolis force. By measuring an electric signal corresponding to the magnitude of the vibration amplitude of the planar vibrating body 10 due to the Coriolis force, for example, the magnitude of the rotational angular velocity can be detected.

In the case where the resonant element 16 is used as an angular velocity sensor, there is provided a detecting portion for measuring the electric signal corresponding to the magnitude of the vibration amplitude of the planar vibrating body 10 due to the Coriolis force.

When the resonant element 16 is produced, the resonance frequency of the planar vibrating body 10 in the direction of the Coriolis force (Y-direction) is previously set at the design stage to the resonance frequency in the X-direction, and the shape, dimension, weight, etc. of the planar vibrating body 10 are designed and produced so that the above-mentioned resonance frequency is obtained. In many cases, however, the shape, dimension, weight, etc. of the planar vibrating body 10 are not achieved as designed, because of the machining accuracy of silicon micromachining technique. Accordingly, deviation of the resonance frequency of the planar vibrating body 10 from the designed frequency often occurs. If the vibration of the planar vibrating body 10 is in a resonant state, the amplitude is greatly amplified by virtue of the value of the Q (quality factor) related to the structure, but if the frequency deviates, a problem arises in that the amplitude is not nearly amplified as much, resulting in the sensitivity of the resonant element begin significantly reduced. It is, therefore, necessary to perform trimming with respect to the weight portion 2 and/or the support beams 3 by, for example, a complicated machining process, to thereby adjust the resonance frequency of the planar vibrating body 10 to the design frequency.

Since the resonant element 16 is, however, a minute resonant element 16, it is practically impossible because of the accuracy of conventional mechanical trimming techniques to perform trimming of the minute weight portion 2 and/or support beams 3 so as to have the desired dimensions, shape, and weight, etc. It is, therefore, very difficult to adjust the resonance frequency of the planar vibrating body 10 to a set value.

Therefore, in the resonant element 16, as shown in FIG. 7B, a conductive layer 12 for providing an electrostatic attractive force 15 is located at a position opposed to the weight portion 2 in the Y-direction with a gap therebetween. As shown in FIG. 7A, the conductive layer 12 is connected to a conductive pad 14 via a conductive pattern 13. By controlling the voltage to be applied to the conductive layer 12 via the conductive pattern 13 and conductive pad 14, the resonance frequency of the resonant element 16 is adjustable to a set value.

Once a DC voltage is applied to the conductive layer 12, an electrostatic force acts on the planar vibrating body 10 as an electrostatic spring. Specifically, when the planar vibrating body 10 vibrates in the direction such that the planar vibrating body 10 approaches the substrate 1, an electrostatic force acts in the direction such that the amplitude is increased, and hence the application of the DC voltage to the conductive layer 12 has an effect of generating a force in the opposite direction as if a mechanical spring were being compressed. This results in a reduction in the resonance frequency in the Y-direction. Since this reduced amount of the resonance frequency varies in accordance with the electrostatic attractive force 15, a fine-adjustment of the resonance frequency of the planar vibrating body 10 from the natural frequency thereof to the lower frequency side can be performed by adjusting the magnitude of the DC voltage applied to the conductive layer 12.

Utilizing this effect, by designing the natural resonance frequency of the planar vibrating body 10 in the Y-direction to be slightly higher than the most sensitive resonance frequency (the resonance frequency in the X-direction), i.e., by designing the resonance frequency of the planar vibrating body 10 in the detection direction to be higher than the resonance frequency thereof by the exciter 4 in the vibrational direction, the sensitivity of the resonant element 16 can be increased by adjusting the DC voltage applied to the conductive layer 12.

In the resonant element 16, it is important to adjust the resonance frequency thereof to a set value and to keep the vibrating state of the planar vibrating body 10 on-target. FIGS. 6A and 6B illustrate examples of movements of a planar vibrating body 10 in the X-Y plane without angular velocity around the Z-axis, when the planar vibrating body 10 is vibrated in the X-direction. In the resonant element 16 shown in FIGS. 7A and 7B, if the vibration of the planar vibrating body 10 is deflecting in the Y-direction, which is the detection direction, that is, if the planar vibrating body 10 tilts with respect to the substrate plane, a Coriolis force cannot be accurately measured if this tilt is substantial, and the gyro characteristics of the angular velocity sensor or the like deteriorates.

It is therefore desirable that the vibratory state of the planar vibrating body 10 hardly exhibits any deflection in the Y-direction, as shown in FIG. 6B.

Generally, the less the difference ($\Delta f$) in the resonance frequency of the planar vibrating body 10 between the vibrational direction and detection direction, the larger the mechanical coupling between the two directions (the propagation of a mechanical energy and the interaction between the two vibration modes) becomes and the larger the deflection in the detection direction while the resonant element 16 is driven becomes. In particular, the dimensional error or the residual stress when the resonant element is produced, increases this mechanical coupling.

In the resonant element 16, therefore, even if the difference ($\Delta f$) in the resonance frequency of the planar vibrating body 10 between the vibrational direction and detection direction is reduced in order to increase the sensitivity thereof, a Coriolis force can not be accurately measured, if the deflection amount in the detection direction increases. As a result, a resonant element 16 having high sensitivity and accuracy can not be obtained only by reducing the above-described difference ($\Delta f$) in the resonance frequency through providing a conductive layer 12. It has therefore been difficult to achieve a resonant element 16 wherein the difference ($\Delta f$) in the resonance frequency is small and wherein the deflection in the detection direction is small, and the yield of the resonant elements 16 capable of meeting both characteristics has been very low.

In principle, it is possible to perform mechanical trimming in a conventional resonant element 16 having a dimensional error or the like so as to reduce the deflection amount of the planar vibrating body 10 in the detection direction; however, from a practical standpoint, it is not practicable to perform mechanical trimming while evaluating the deflection amount of the planar vibrating body 10.

It is also impractical and would take an extremely long time to bring the deflection amount to zero by performing repeated trimming operation in such a way that the deflection amount of the planar vibrating body 10 is ascertained after trimming, and that trimming is again performed. Accordingly, there is a need for a resonant element 16 which allows the difference ($\Delta f$) in the resonance frequency of the planar vibrating body 10 between the vibrational direction and the detection direction to be small and which allows the deflection in the detection direction to be small, without the need for the above-described repetitive trimming.

SUMMARY OF THE INVENTION

The present invention has been made in order to solve the above-described problems. It is an object of the present invention to provide a resonant element allowing both the difference ($\Delta f$) in the resonance frequency of the planar vibrating body 10 between the vibrational direction and the detection direction and the deflection in the detection direction to be small, without the need for troublesome trimming.

In order to achieve the above-described object, the present invention has the following constitutions. In a first aspect, a weight portion is disposed above a fixed substrate in a state isolated from said fixed substrate, of which the substrate plane direction is an X-Z two-dimensional plane direction; a planar vibrating body comprising said weight portion is supported by said fixed substrate via support beams so as to be vibratable in an X-direction; an exciter for vibrating the planar vibrating body in the X-direction is provided; and vibrating body tilt correcting means for adjusting the resonance frequency of the planar vibrating body by giving electrostatic forces to the planar vibrating body thereby correcting the tilt of the planar vibrating body with respect to the substrate plane direction of the fixed substrate.

In accordance with another aspect, the tilt correcting means are provided at least at the both edge areas of the planar vibrating body with a gap therebetween in the X-direction and are spaced from the vibrating body in a Y-direction orthogonal to the X-Z two-dimensional plane direction.

In accordance with another aspect, the planar vibrating body comprises a frame body disposed above the fixed substrate in a state isolated from the fixed substrate, and a weight portion connected to the inside of the frame body by connection beams. First vibrating body tilt correcting means are provided at least at the both edge areas of the weight portion with a gap therebetween in the X-direction and spaced from the vibrating body in the Y-direction. Second vibrating body tilt correcting means are provided at positions opposed to the frame body and across the first vibrating body tilt correcting means via gaps in the X-direction.

In accordance with another aspect, the stress canceling means are provided which directly or indirectly applies to the support beams a force in a direction such that the tensile stresses within the support beams, are canceled, the tensile stresses being caused by electrostatic attractive forces given to the planar vibrating body by the vibrating body tilt correcting means.

In accordance with another aspect, the stress canceling means are arranged so as to sandwich the planar vibrating body between the stress canceling means and the vibrating body tilt correcting means via gaps.

In accordance with another aspect, a vertical movement side electrode is provided on at least one of the front surface and rear surface of the weight portion, and a fixed opposing electrode is provided on the side opposed to the vertical movement side electrode with a gap interposed in the Y-direction; and the set of the vertical movement side electrode and the fixed opposing electrode are formed as a detecting electrode for detecting the vibration amplitude of the weight portion in the Y-direction caused by a variation in an angular velocity of rotation applied to the resonant element around the Z-axis.

In accordance with another aspect, the weight portion is formed of silicon or polysilicon, and constitutes a vertical movement side electrode in itself.

In the present specification and claims, the term "both edge areas" represents a wider concept including areas somewhat inside both edge portions or areas somewhat outside both edge portions in the planar vibrating portion or the weight portion.

In accordance with the present invention, both the adjustment of the resonance frequency of the planar vibrating body and the correction of the tilt of the planar vibrating body with respect of the substrate plane direction of the fixed substrate can be performed by the described vibrating body tilt correcting means. It is thereby possible, without the need for troublesome trimming, to reduce the difference between the vibrational direction of the planar vibrating body vibrating by a Coriolis force and the detection direction thereof, as well as to reduce the deflections in the detection direction, and to create thereby a superior resonant element having a high sensitivity and a low noise level.

In the resonant element wherein the planar vibrating body comprises a frame body and a weight portion, and wherein first vibrating body tilt correcting means are provided at least at both edge areas of the weight portion, and wherein second vibrating body tilt correcting means are provided at positions opposed to the frame body and across the first vibrating body tilt correcting means via a gap in the X-direction, the resonance frequency of the planar vibrating body comprising the weight portion and the frame body can be adjusted, and the tilt of the weight portion and the frame body with respect to the plane of the substrate can be individually corrected.

Furthermore, in the resonant element in accordance with the present invention, when the weight portion is connected to the inside of the frame body by the connection beams, the movement of the frame body and the weight portion can be made independent of each other by the construction of the connection beam so that, for example, when the planar vibrating body vibrates in the X-direction and rotates around the Z-axis, only the weight portion vibrates in the Y-direction but the frame body hardly vibrates. This allows the planar vibrating body to perform excitation vibration more stably in the vibrational direction.

Moreover, in the resonant element in accordance with the present invention wherein stress canceling means is provided, since a force in a direction such that tensile stresses within the support beams caused by electrostatic forces given to the planar vibrating body by the vibrating body tilt correcting means are counteracted can be applied to the support beams directly or indirectly by the stress canceling means, the occurrence of various problems caused by any troublesome tensile stresses within the support beams can be reliably avoided. This allows a resonant element having a higher sensitivity and a lower noises to be provided.

Also, in accordance with the present invention wherein a vertical movement side electrode is provided on at least one of the front surface and rear surface of the weight portion (or where the weight portion itself serves as the vertical movement side electrode), and wherein a fixed opposing electrode is provided at the side opposed to the vertical movement side electrode with a gap interposed in the Y-direction, and wherein the set of the vertical movement side electrode and the fixed opposing electrode are constituted as a detecting electrode for detecting the vibration amplitude of the weight portion in the Y-direction due to an angular velocity around the Z-axis, a variation in an angular velocity of the rotation around the Z-axis can be accurately detected by the detecting electrode.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWING(S)

FIGS. 2A to 2D are explanatory cross sectional views showing the production process of the resonant element in accordance with the first embodiment.

Figure 7A:
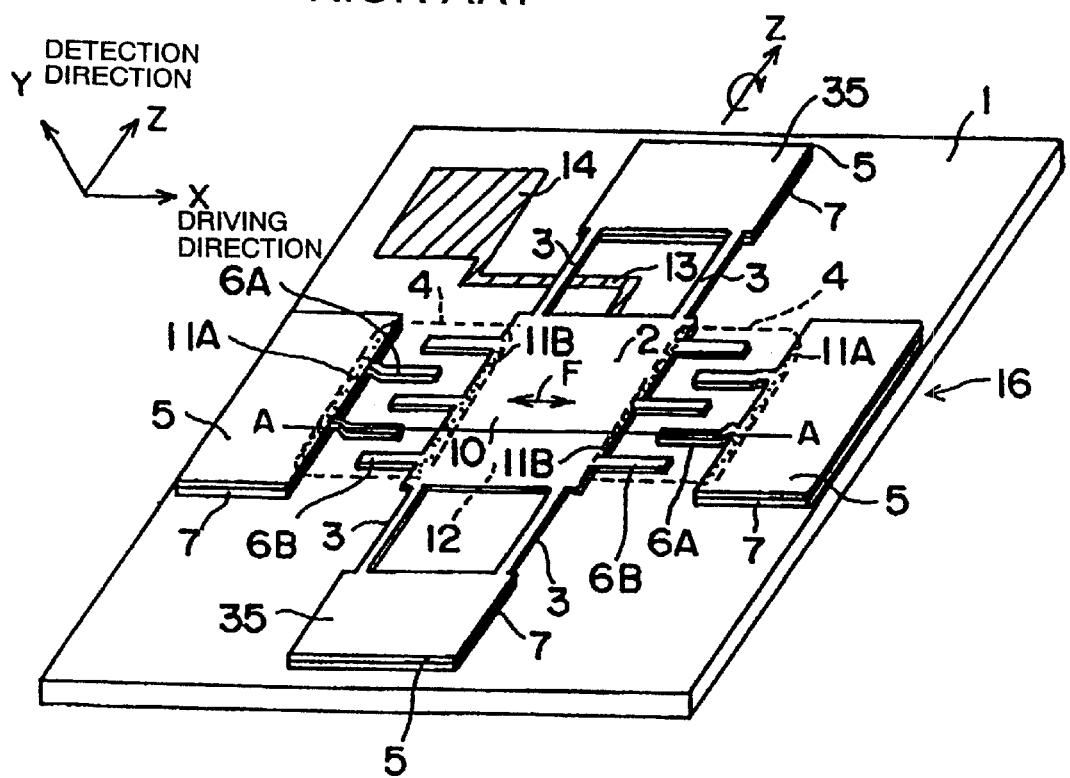

FIG. 7A a perspective view illustrating an example of a conventional resonant element, and 7B is a cross sectional view taken along line A—A in FIG. 7A.

DETAILED DESCRIPTION OF EMBODIMENTS OF THE INVENTION

Hereinbelow, the embodiments in accordance with the present invention will be explained based on the drawings. In the descriptions of these embodiments, the same components as the above-described previous resonant element are identified by the same reference numerals and a repetition of detailed descriptions thereof are omitted.

Figure 1A:
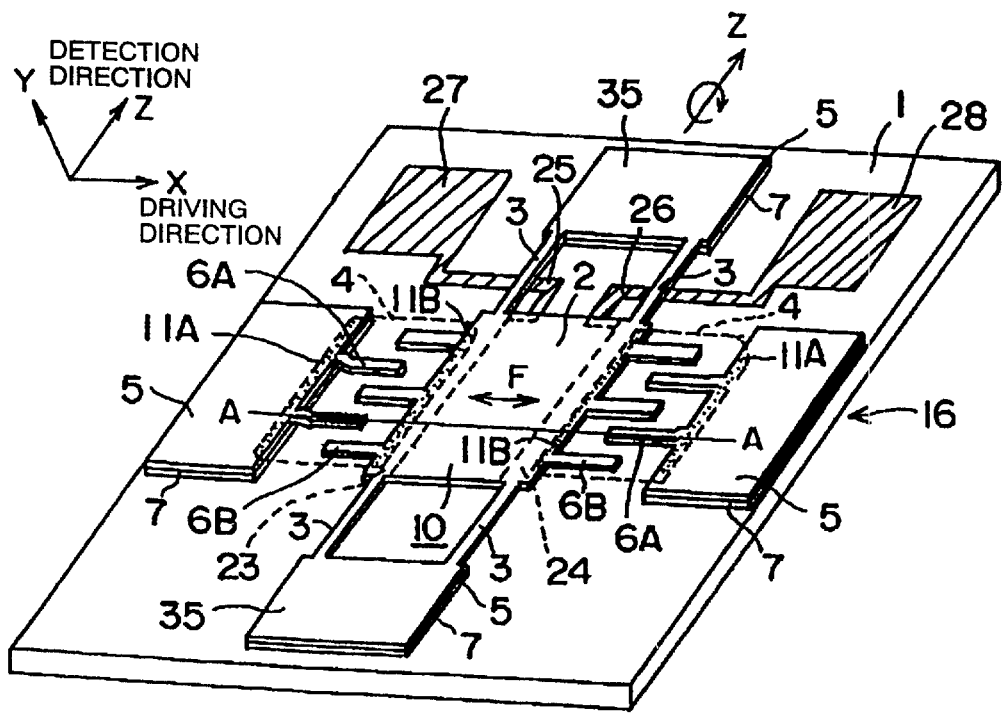
FIG. 1A is a perspective view showing the construction of the main section of a resonant element in accordance with a first embodiment of the present invention.
Figure 1B:
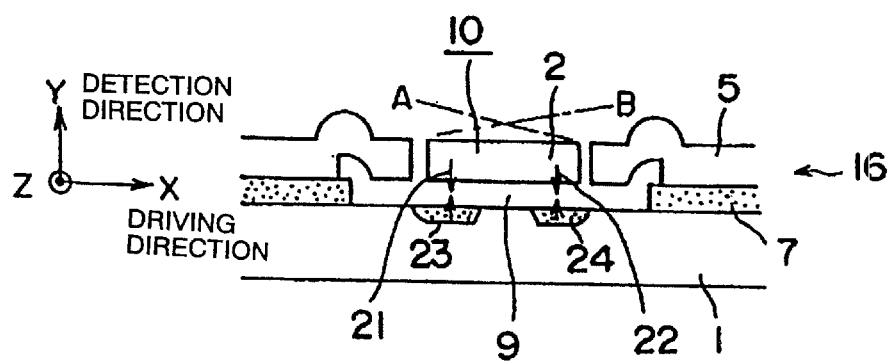
FIG. 1B is a cross sectional view taken along the line A—A in FIG. 1A.

FIGS. 1A and 1B show a first embodiment of a resonant element 16 in accordance with the present invention. As in the case of the above-described previous resonant element 16, the first embodiment of the resonant element 16 is a microelement produced utilizing a silicon micromachining technique or the like, and is used, for example, in an angular velocity sensor or the like.

Figure 7B:
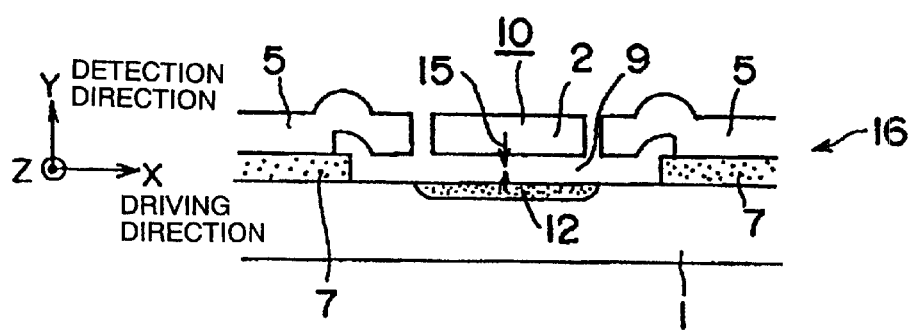

As is the case with the previous resonant element 16 in FIGS. 7A and 7B, the first embodiment of the resonant element 16 comprises a planar vibrating body 10 and an exciter 4 utilizing the electrostatic forces of comb electrodes 6A and 6B.

It has been found that the above-described deflections of the planar vibrating body 10 in the detection direction are principally attributable to the tilt of the planar vibrating body 10 with respect to the substrate plane direction of the fixed substrate 1. In this first embodiment, therefore, a vibrating body tilt correcting means have been provided specifically for adjusting the resonance frequency of the planar vibrating body 10 and correcting the tilt of the planar vibrating body 10 with respect to the substrate plane direction of the fixed substrate 1.

More specifically, in this first embodiment, as shown in FIG. 1B, two conductive layers 23 and 24 are provided at both edge areas of the planar vibrating body 10 with a gap in the X-direction therebetween, on the plane of the substrate 1 opposed to the plane of the planar vibrating body 10 with a gap interposed in the Y-direction, and these conductive layers 23 and 24 are used as vibrating body tilt correcting means for adjusting the resonance frequency of the planar vibrating body 10 by providing electrostatic attractive forces 21 and 22 to the planar vibrating body 10, and correcting the tilt of the planar vibrating body 10 with respect to the substrate plane direction of the fixed substrate 1.

As shown in FIG. 1A, the conductive layer 23 is connected to a conductive pad 27 via a conductive pattern 25, and the conductive layer 24 is connected to a conductive pad 28 via a conductive pattern 26.

In the first embodiment, the resonance frequency (fy=5.5 Hz for example) of the planar vibrating body 10 in the detection direction is designed to be somewhat (500 Hz) higher than the resonance frequency (fx=5 kHz for example) of the planar vibrating body 10 by an exciter 4 in the vibrational direction (i.e., the X-direction).

FIG. 2A to 2D show the production process of the resonant element in accordance with the first embodiment. As shown in FIG. 2A, first a nitride film 7 is formed on the outer periphery side on the silicon substrate 1, and on the central portion of the substrate 1, conductive layers 23 and 24 as vibrating body tilt correcting means doped with phosphorus P or boron B, are formed with a gap therebetween in the X-direction therebetween. The formation positions of the conductive layers 23 and 24 are arranged to be both edge areas of the weight portion 2 (planar vibrating body 10) which is to be formed above the substrate I in an isolated state at a later step.

Then, as illustrated in FIG. 2B, a sacrificial layer 8 such as an oxide film is formed over the conductive layers 23 and 24 so as to lie astride the nitride film 7 on the outer periphery side.

Next, as illustrated in FIG. 2C, a polysilicon film is formed over the nitride film 7 and the sacrificial film 8, and forms the patterns of the weight portion 2 and the comb electrodes 6A and 6B. Then, as shown in FIG. 2D, the sacrificial layer 8 is removed by, for example, dry etching, and the weight portion 2 is formed so as to be isolated from the substrate 1 and constitutes the planar vibrating body 10. By disposing these conductive layers 22 and 23 at both edge areas of the planar vibrating body 10 so as to be opposed to each other, the resonant element 16 is accomplished.

The first embodiment of the resonant element 16 is produced as described above, and has a construction as shown in FIGS. 1A and 2B. As described with respect to the above-described previous resonant element, the planar vibrating body 10 can be vibrated by driving the exciter 4 in the X-direction orthogonal to the length of the support beam 3. Once the resonant element 16 is rotated around the Z-axis at this state, a Coriolis force occurs. This Coriolis force is applied to the planar vibrating body 10, and the planar vibrating body 10 vibrates in the direction of the Coriolis force (Y-direction). Measurement of this vibration amplitude allows the angular velocity to be detected.

Also, in the first embodiment, since the conductive layers 23 and 24 have been provided as means for correcting the tilt of the planar vibrating body 10, it is possible, when vibrating the planar vibrating body 10, to pull both edge areas opposed to the conductive layers 23 and 24, as shown in FIG. 1B, toward the substrate 1 by the electrostatic attractive forces 21 and 22 by individually applying DC voltages to the conductive layers 23 and 24 via the conductive pads 27 and 28, respectively, and to thereby perform a tilt correction with respect to the planar vibrating body 10. By performing a tilt correction, the vibrational deflections in the detection direction of the planar vibrating body 10 can be corrected.

Specifically, when the planar vibrating body 10 vibrates, if the planar vibrating body 10 tilts downwardly to the right as indicated by a broken line A in FIG. 1B, a DC voltage higher than that applied to the conductive layer 24 is applied to the conductive layer 23, and the edge region side of the planar vibrating body 10 opposed to the conductive layer 23 is pulled toward the substrate 1 side more strongly than the edge region of the planar vibrating body 10 opposed to the conductive layer 24, whereby the downward tilt to the right is corrected.

In contrast to this, if the planar vibrating body 10 tilts downwardly to the left as indicated by a broken line B in FIG. 1B, a DC voltage higher than that applied to the conductive layer 23 is applied to the conductive layer 24. By pulling the edge region side of the planar vibrating body 10 opposed to the conductive layer 24 toward the substrate 1 side more strongly than the edge region of the planar vibrating body 10 opposed to the conductive layer 23, the downward tilt to the left is corrected.

The conductive layer 23 and 24 each function for correcting the tilt of the planar vibrating body 10, and simultaneously function as means for adjusting the resonance frequency of the planar vibrating body 10. That is,. the conductive layer 23 and 24 can lower the resonance frequency of the planar vibrating body 10 in the detection direction by pulling the planar vibrating body 10 toward the substrate I side by the electrostatic forces 21 and 22 due to the application of DC voltages to the respective conductive layers 23 and 24. Hence, by previously designing the resonance frequency of the planar vibrating body 10 in the detection direction to be slightly higher than that of the vibratory frequency, and by lowering the resonance frequency of the planar vibrating body 10 in the detection direction through pulling the planar vibrating body 10 toward the substrate 1, the difference (Δf) in the resonance frequency between the driving direction and the detection direction of the planar vibrating body 10 can be adjusted to be small.

In other words, in the first embodiment, by adjusting the DC voltages applied to the conductive layers 23 and 24, it is possible to correct the tilt of the planar vibrating body 10, and simultaneously to adjust the difference (Δf) in the resonance frequency between the driving direction and the detection direction of the planar vibrating body 10 to be small by lowering the resonance frequency of the planar vibrating body 10 in the detection direction by an appropriate value.

Suppose, in the resonant element 16, the displacement (deflection amount) in the detection direction (Y-direction) of the planar vibrating body 10 with respect to the displacement in the driving direction (X-direction) thereof is not less than 5 percent when not applying DC voltages to the conductive layers 23 and 24, or when applying equal DC voltages to the conductive layers 23 and 24. At this time, for example, the voltage to be applied to the conductive layer 23 is set to 0, and the voltage to be applied to the conductive layer 24 is varied from 0 to 20 V (or, conversely, the voltage to be applied to the conductive layer 24 is set to 0, and the voltage to be applied to the conductive layer 23 is varied from 0 to 20 V). Thereby, an applied voltage value is found which allows the tilt of the planar vibrating body 10 to be correct and which allows the displacement in the detection direction of the planar vibrating body 10 with respect to the displacement in the driving direction thereof to be not more than 2 percent.

Suppose that the above-described displacement (deflection amount) of not more than 2 percent can be achieved when the voltage to be applied to the conductive layer 23. is set to 0, and the voltage to be applied to the conductive layer 24 is set to 10V. At this time, a DC voltage (0+a) V is applied to the conductive layer 23, and a DC voltage (10+b) V is applied to the conductive layer 24

(where both a and b have positive values, and are adjusted to make the difference (Δf) in the resonance frequency between the driving and detection directions small. Thereby, the resonance frequency of the planar vibrating body 10 in the detection direction which has been designed to be rather higher than that in the vibrational direction, can be adjusted to be smaller, so that the difference (Δf) in the resonance frequency between the driving direction and the detection direction can be adjusted to be small.

Such an adjustment allows the deflection amount due to the tilt of the of the planar vibrating body 10 with respect of the plane of the substrate 1 to be not more than 2 percent, and allows the difference (Δf) in the resonance frequency between the driving direction and the detection direction to be made small. It has been experimentally verified that the detection sensitivity of the resonant element 16 increases from about 0.9 degree/sec. to about 0.3 degree/sec. That is, about a three-fold (0.9/0.3) increase in detection sensitivity (resolution) has been achieved. Furthermore, an increase of even more than three-fold can be attained depending on conditions of the planar vibrating body 10, the support beams 3, or the magnitude of the DC voltage to be applied to the conductive layers 23 and 24.

In accordance with this first embodiment, as described above, the conductive layers 23 and 24 as vibrating body tilt correcting means for performing the resonance frequency adjustment and the tilt correction with respect to the planar vibrating body 10 are disposed with a gap in the X-direction therebetween, at the positions on the substrate 1 opposed to the planar vibrating body 10. By appropriately adjusting the value of the DC voltage to be applied to these conductive layers 23 and 24, the difference in the resonance frequency between the driving direction and the detection direction of the planar vibrating body 10 can be adjusted to be small and the tilt of the planar vibrating body 10 can be reduced. It is therefore possible to make this resonant element 16 a superior resonant element 16 having a high sensitivity and a low noise level, without being bound by errors occurring during the production process or a change in use circumstances, and without the need for mechanical trimming of the planar vibrating body 10 or support beams 3.

In particular, in this first embodiment, the conductive layers 23 and 24 are provided at both edge areas of the planar vibrating body 10 with a gap in the X-direction therebetween, thereby the distance between the gravity position of the weight portion 2 which is the planar vibrating body 10, and the position where the electrostatic forces 21 and 22 are applied, may be increased. This provides increased leverage, therefore, the tilt of the planar vibrating body 10 can be corrected even by small electrostatic forces 21 and 22, and the magnitude of the voltage applied to the conductive layers 23 and 24 via the conductive pads 27 and 28 can be reduced. As a result, the upsizing of the resonant element 16 is rendered unnecessary, and a small resonant element 16 can be achieved.

Also, in this first embodiment, if a vertical movement side electrode 30 is provided on the surface of the weight portion 2, as shown in FIG. 2D, for example, and a fixed opposing electrode 31 is provided on the side opposed to the vertical movement side electrode 30 with a gap interposed in the Y-direction, and if the set of the vertical movement side electrode and the fixed opposing electrode are constituted as a detection electrode for angular velocity around the Z-axis for detecting the vibration amplitude of the weight portion in the Y-direction corresponding to the variation in the angular velocity of the rotation around the Z-axis, it is possible to detect the angular velocity by detecting the Coriolis force in the Y-direction generated by the rotation around the Z-axis, as described above.

When the fixed opposing electrode 31 is thus disposed on the opposite side of the substrate 1 side, the resonant element 16 can be formed, as indicated by the chain line in FIG. 2(D), by fixing the fixed opposing electrode 31 on a cover 32 made of e.g. glass and by bonding the glass cover to a polysilicon film 5 at a bonded portion 34 by means of anode bonding. Alternatively, the resonant element 16 can be formed by previously vapor depositing a metal such as gold on the bonded portion 34, and performing eutectic bonding with respect to the bonded portion 34.

Figure 3A:
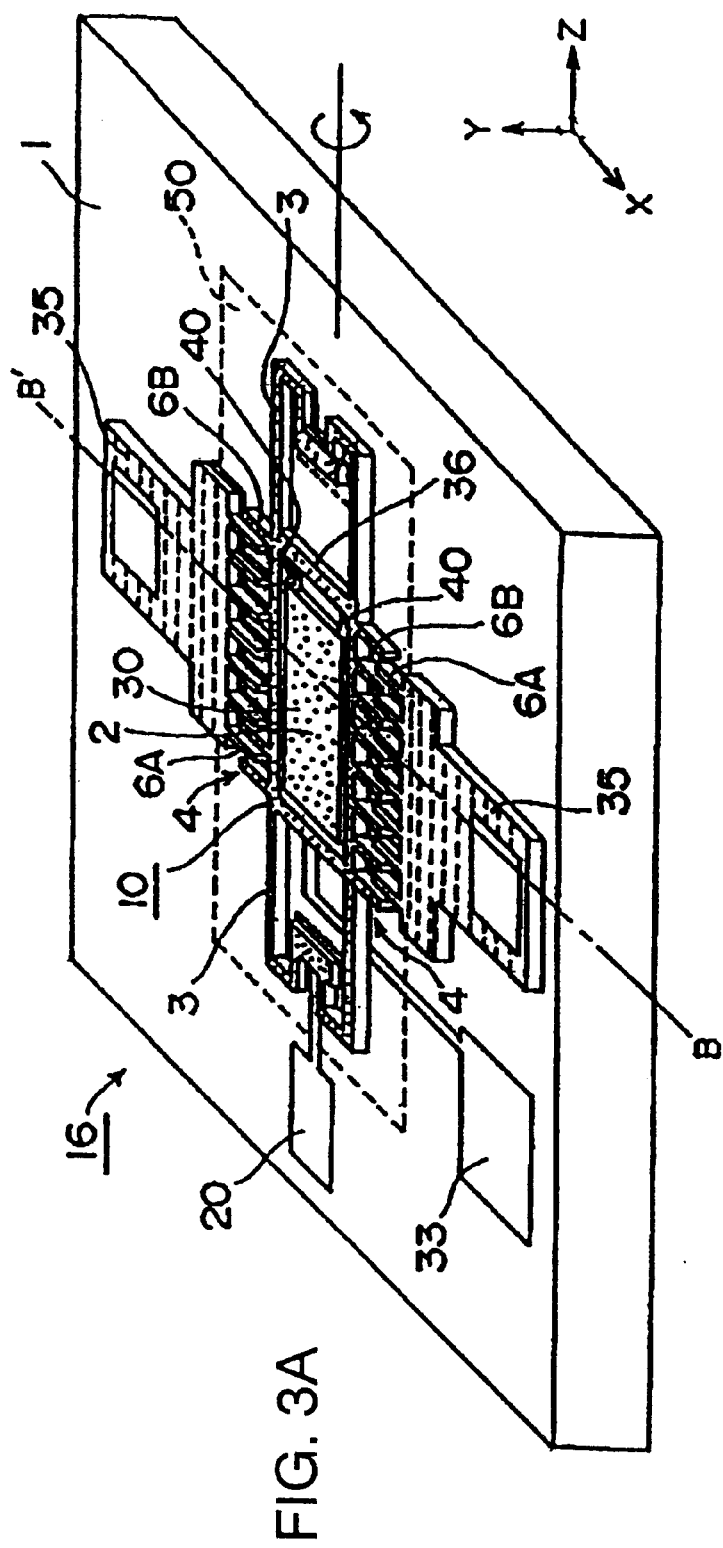
FIG. 3A is a perspective view showing the construction of the main section of a resonant element in accordance with a second embodiment of the present invention.
Figure 3B:
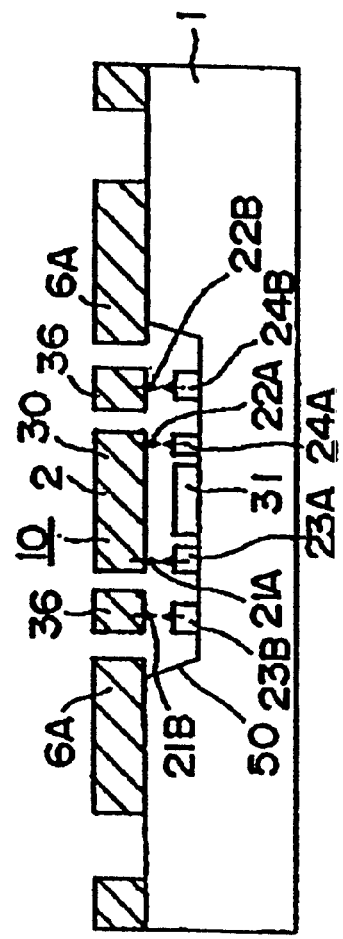
FIG. 3B is a cross sectional view taken along line B'—B' in FIG. 3B.

In FIG. 3A, the construction of the main section of a resonant element 16 in accordance with a second embodiment of the present invention is shown as a perspective view. In FIG. 3B, a sectional view taken along the line B—B in FIG. 3A is shown. In the descriptions of this second embodiment, the same components as the above-described first embodiment are identified by the same reference numerals, and repeated explanations thereof are omitted.

The resonant element 16 in accordance with the second embodiment is an angular velocity sensor. The difference between this second embodiment and the above-described first embodiment is characterized in that, firstly, as shown in FIG. 3A, the planar vibrating body 10 is constructed so as to have a frame body 36 disposed above the substrate 1 in a isolated state, and have the weight portion 2 connected to the inside of the frame body 36 by connection beams 40, and that, secondly, as shown in FIG. 3B, the resonant element 16 is constructed by providing the conductive layers 23A and 24A as the first vibrating body tilt correcting means, and the conductive layers 23B and 24B as the second vibrating body tilt correcting means. The conductive layers 23A and 24A are disposed at both edge areas of the weight portion 2 with a gap in the X-direction therebetween, on the side of substrate 1 opposed to the planar vibrating body 10, and the conductive layers 23B and 24B are disposed at the positions across the conductive layers 23A and 24A via a gap in the X-direction.

The conductive layers 23A, 24A, 23B, and 24B are each connected to conductive pads (not shown) via individual patterns (not shown). In this second embodiment, by adjusting the DC voltage to be applied to each of the conductive pads and, thereby, providing electrostatic forces 21A, 22A, 21B, and 22B to the planar vibrating body 10, the resonance frequency of the planar vibrating body 10, and the tilt of the planar vibrating body 10 with respect to the substrate plane direction of the substrate 1 can be adjusted.

In this second embodiment, the weight portion 2 is formed of e.g. silicon or polysilicon, thereby, weight portion 2 itself performs the function of a vertical movement side electrode 30. On the substrate 1 opposed to the weight portion 2 with a gap interposed in the Y-direction, a fixed opposing electrode 31 is provided, the set of the weight portion 2 (vertical movement side electrode 30) and the fixed opposing electrode 31 is constituted as a detecting electrode for angular velocity around the Z-axis for detecting the vibration amplitude of the weight portion in the Y-direction, the vibration amplitude corresponding to the variation in the angular velocity of the rotation around the Z-axis.

Also, in this second embodiment, the substrate 1 is made of glass. A vibrator, fixation portion, etc. having a planar vibrating body 10 and support beams 3 are formed on the substrate 1 by micromachining a silicon layer having a thickness of 50 mm. Furthermore, in this second embodiment, as in the cases of the above-described previous resonant element and the first embodiment, conductive layers for driving (not shown) are each connected to the comb electrodes 6a and 6B, and are connected to external electrode pads (not shown) via conductive patterns to form an exciter 4.

The two connection beams 40 are disposed along the Z-direction orthogonal to the X-direction which is the vibrational direction on the right-side of the weight portion 2. The weight portion 2 is connected to the right side (as viewed in FIGS. 2A and 2B) of the rectangular frame body 36 by the connection beams 40. The connection beams 40 formed so that the thickness in the Y-direction which is the detecting vibration direction of the weight portion 2, is less than 50 mm, and so that the rigidity in the Y-direction is smaller than that in the X-direction which is the vibrational direction of the planar vibrating body 10. On the other hand, the support beams 3 are formed so that the rigidity in the X-direction which is the vibrational direction of the planar vibrating body 10 is smaller than that in the Y-direction which is the detecting vibration direction of the weight portion 2.

In FIGS. 3A and 3B, reference numeral 50 designates a recess constituting a cavity, reference numeral 20 designates a connection electrode for the weight portion 2 (i.e., for the vertical movement side electrode 30), and reference numeral 33 designates a connection electrode for the fixed opposing electrode 31.

The second embodiment is constituted so that conductive layers 23A and 24A are provided at the positions corresponding to both edge areas of the weight portion 2 of the planar vibrating body 10 for pulling the weight portion 2 toward the substrate 1 side by the electrostatic attractive forces 21A and 22A, and so that conductive layers 23B and 24B are provided at the positions across the conductive layers 23A and 24A corresponding to the frame body 36 for pulling the frame body 36 toward the substrate 1 side by the electrostatic attractive forces 21B and 22B. This allows the resonance frequency in the Y-direction of the planar vibrating body 10 having the weight portion 52 and the frame body 36 to be adjusted, and also allows the tilts of the weight portion 2 and the frame body 36 with respect to the plane of the substrate 1 to be individually corrected.

The second embodiment can, therefore, exert a similar effects to the above-described first embodiment.

Moreover, in the second embodiment, the planar vibrating body 10 is constructed so as to have the frame body 36 and the weight portion 2, and the planar vibrating body 10 is formed so that the rigidity of connection beams 40 for connecting the frame body 36 and the weight portion 2 with respect to the Y-direction is smaller than the rigidity thereof with respect to the X-direction, and that the rigidity of support beams 3 for supporting the planar vibrating body 10 and with respect to the X-direction is smaller than the rigidity thereof with respect to the Y-direction. Thereby, it becomes possible that, when the planar vibrating body 10 vibrates in the X-direction and rotates around the Z-axis, only the weight portion vibrates in the Y-direction and the frame body hardly vibrates in the Y-direction. As a result, there is no risk that the comb electrode 6B is displaced in the Y-axis direction with respect to the comb electrode 6A, so that the planar vibrating body 10 always can stably perform an excitation vibration maintaining the magnitude of the amplitude corresponding to the voltage applied to the above-described conductive layers for driving, and can detect the angular velocity around the Z-axis with a higher accuracy.

In addition, in the second embodiment, since the connection beams 40 are provided along the Z-direction orthogonal to the X-direction which is the vibrational direction of the planar vibrating body 10, there is no risk that movement due to acceleration caused by the vibration of the planar vibrating body 10 occurs in the torsional direction of the weight portion 2, causing fluctuating components in the vertical direction. As a result, this moment does not affect the Coriolis force generated in the Y-direction, which leads to a detection of the rotational angular velocity with a higher accuracy.

Now a third embodiment will be described hereinbelow with reference to FIGS. 4A to 4C. The third embodiment is characterized in that stress canceling means are provided. Other constructions are similar to the above-described first and second embodiments. In the descriptions of this third embodiment, the same components as the above-described first and second embodiments are identified by the same reference numerals and repeated descriptions thereof are omitted.

When the vibrating body tilt correcting means (conductive layers 23 and 24) are provided as described above, and the planar vibrating body 10 is pulled toward the substrate 1 by electrostatic forces, tensile stresses are generated within the support beams 3. This raises concerns that these tensile stresses of the support beams 3 cause the vibration amplitude of the planar vibrating body 10 to be somewhat reduced, resulting in a reduction in the sensitivity thereof, or that the tensile stresses within the support beams 3 momentarily disturb the planar vibrating body 10, resulting in the generation of noise in an electric signal for detection.

Accordingly, the third embodiment is arranged so that forces which counteract the tensile stresses, are applied to the support beams 3 by providing the above-described stress canceling means. FIG. 4A shows an example in the case where the above-described stress canceling means is added to the resonant element 16 shown in FIG. 1, while FIG. 4B shows an example in the case where the above-described stress canceling means is added to the resonant element 16 shown in FIGS. 3A and 3B. As illustrated in FIGS. 4A and 4B, in this third embodiment, conductive layers 41 and 42 (41A, 41B, 42A, and 42B) which are stress canceling means, are disposed so as to be opposed to the above-described vibrating body tilt correcting means (conductive layers 23 and 24,(23A, 23B, 24A, and 24B)) with the plane of the planar vibrating body 10 interposed, and so as to sandwich the planar vibrating body between these conductive layers and the vibrating body tilt correcting means via gaps.

Figure 4A:
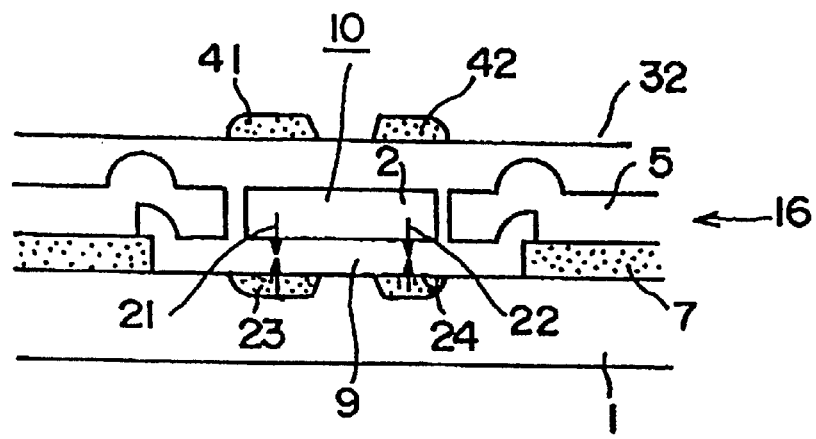
FIGS. 4A to 4C are explanatory views showing a resonant element in accordance with a third embodiment of the present invention.
Figure 4B:
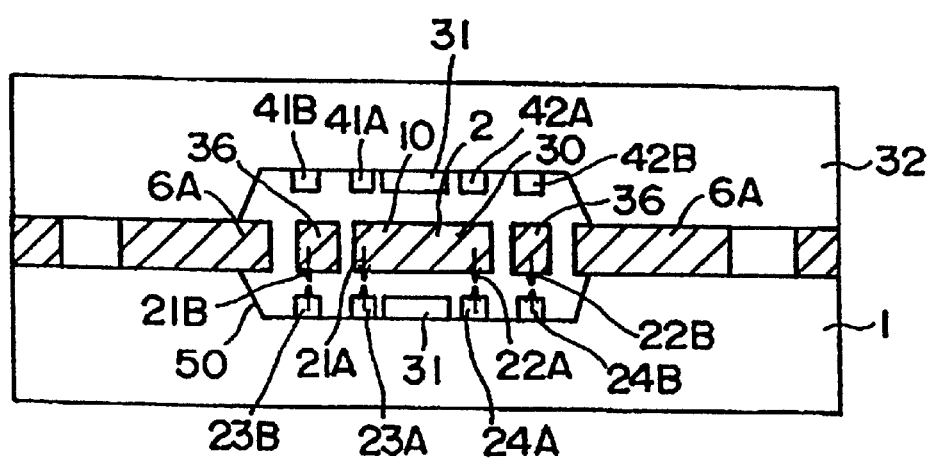
Figure 4C:
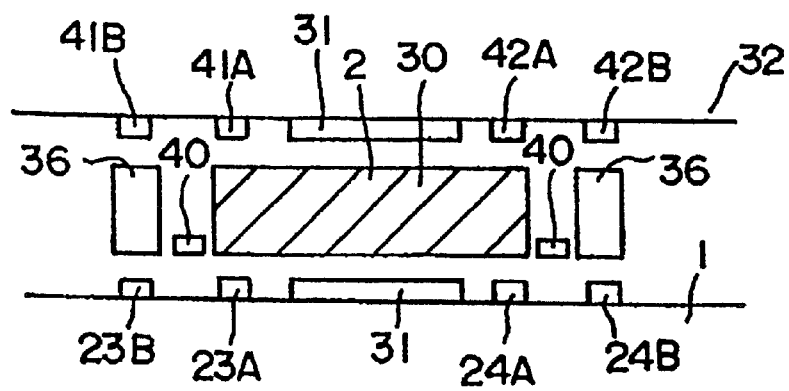

The conductive layers 41 and 42 (41A, 41B, 42A, and 42B) are constructed so that a DC voltage is applied to them via conductive patterns (not shown), and once a DC voltage is applied to these conductive layers 41 and 42 (41A, 41B, 42A, and 42B), electrostatic attractive forces attracting each other occur between the conductive layers 41 and 42 (41A, 41B, 42A, and 42B) and the planar vibrating body 10, and the planar vibrating body 10 is pulled up, in the upward direction in FIGS. 4A to 4C.

Thereby, forces in directions to counteract the tensile stresses, are indirectly applied to the support beams 3, the forces being caused by the above-described vibrating body tilt corresponding means. Hence, it is possible to substantially cancel the above-described tensile stresses of the support beams 3 by adjusting the magnitudes of the DC voltages to be applied to the above-described conductive layers 41, 42 (41A, 41B, 42A, and 42B). For example, letting the magnitudes of the electrostatic attractive forces applied to the planar vibrating body 10 when DC voltages are applied to the conductive layers 23, 24, 41, and 42 be F23, F24, F41, and F42, respectively, the magnitudes of the DC voltages to be applied to the conductive layers 23, 24, 41, and 42 are determined so that the equation F23+F24= F41+F42 holds. Thereby, the above-described tensile stresses within the support beams can be substantially canceled.

In accordance with this third embodiment, since any troublesome tensile stresses within the support beams 3 are canceled by the stress canceling means, the occurrence of various problems caused by the tensile stresses within the support beams 3 can be reliably avoided. This allows the planar vibrating body 10 to make an ideal vibration, and allows a resonant element having a higher sensitivity and lower noise to be provided.

The present invention is not limited to the above-described embodiments. Various embodiments can be adopted. For example, in the above-described first embodiment, the conductive layers 23 and 24 are provided only at both edge areas of the planar vibrating body 10, but the conductive layers 23 and 24 may be provided at least at both edge areas, that is, the conductive layers 23 and 24 may be provided at some portions other than both edge areas. Also, in the above-described first embodiment, the planar vibrating body 10 (weight portion 2) is formed of polysilicon, but may be formed of silicon. When using the resonant element 16 shown in the first embodiment as an angular velocity sensor, the vertical movement side electrode 30 is disposed at the weight portion 2, but the present invention may be arranged so that the weight portion 2 itself functions as a vertical movement side electrode.

In the above-described second embodiment, the conductive layers 23A and 24A as the first vibrating body tilt correcting means are provided only at both edge areas of the weight portion 2, but the conductive layers 23A and 24A may be provided at least at the weight portion 2, that is, the conductive layers 23A and 24A may be provided at some portions other than both edge areas. However, as shown in FIG. 3A, when the fixed opposing electrode 31 is provided under the weight portion 2, the conductive layers 23A and 24A are each disposed at positions which do not interfere with the position of the fixed opposing electrode 31.

Also, in the above-described second embodiment, the connection beams 40 are disposed at the right side of the weight portion 2, and the weight portion 2 is connected to the right side of the frame body 36 by the connection beams 40. However, the connection beams 40 may be disposed at the left side of the weight portion 2, and the weight portion 2 may be connected to the frame body 36 in a straddle-mounted beam state by disposing the connection beams 40 on both sides of the weight portion. Also, the connection beams may be disposed along the X-direction. However, it is preferable that the connection beams be disposed along the Z-direction in order to detect the rotational angular velocity around the Z-axis without being subjected to the effect of acceleration generated by vibration by disposing the connection beams 40 along the Z-direction.

Figure 5A:
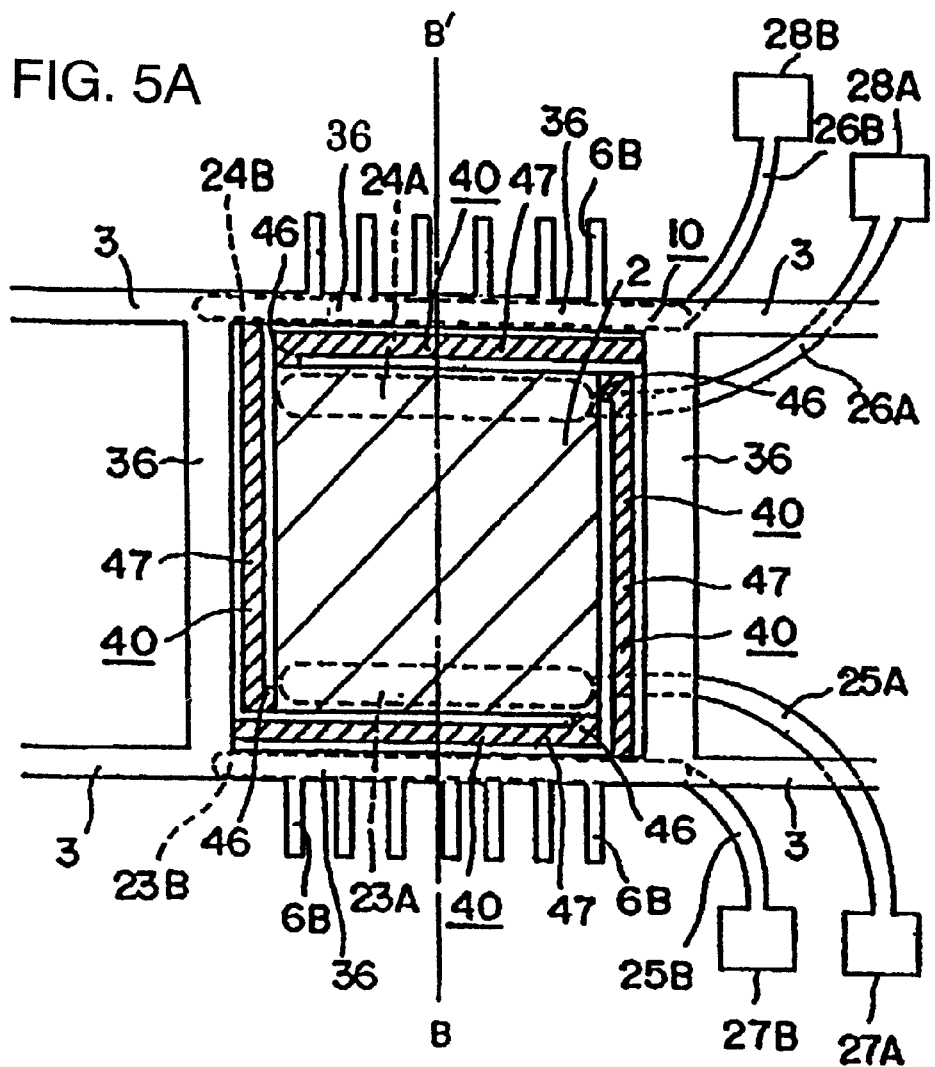
FIG. 5A is a plane view showing a resonant element in accordance with another embodiment of the present invention.
Figure 5B:
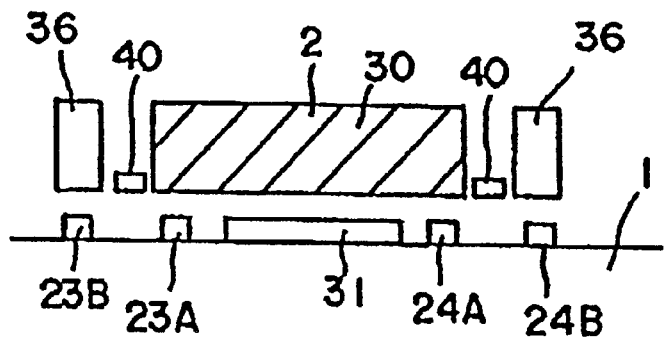
FIG. 5B is a cross sectional view taken along line B'—B' in FIG. 5A.
Figure 6A:
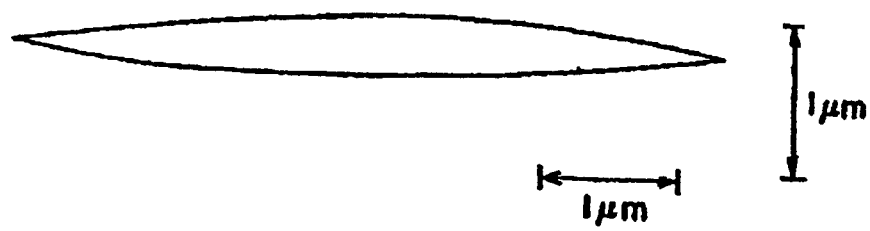
FIGS. 6A and 6B are explanatory views illustrating examples of movements of a planar vibrating body in the X-Y plan when the planar vibrating body is vibrated in the X-direction in a resonant element.
Figure 6B:
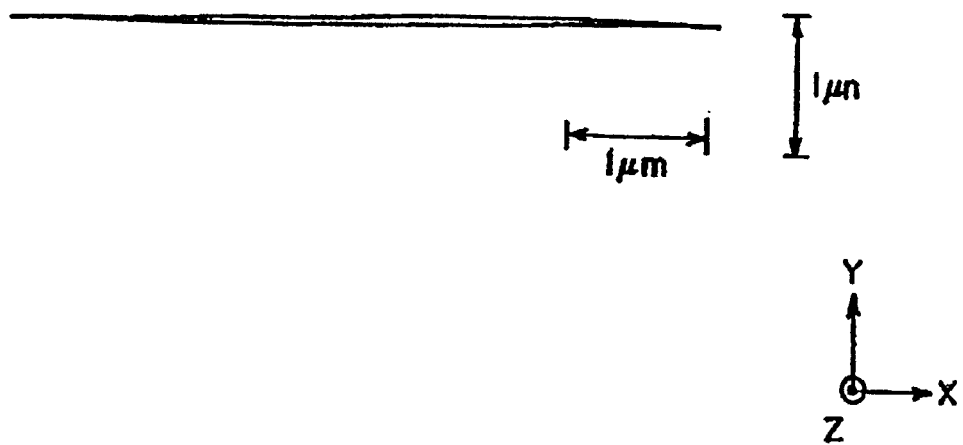

In addition, when the frame body 36 and the planar vibrating body 10 are connected to one another using L-letter shaped connection beams 40, as shown in FIGS. 5A and 5B, the tips of the shorter sides 46 of the L-letter shaped connection beams 40 are each connected to the four corners of the weight portion 2, and the longer sides 47 of the L-letter shaped connection beams 40 are each extended from the corners where the tips of the L-letter shaped shorter sides 46 are connected, along the sides of the weight portions 2 via a gap to the sides of the frame body 36 where the tips of the longer sides 47 are connected to the sides of the frame body 36.

In this case also, as in the case of the above-described second embodiment, by providing the conductive layers 23A, 24A, 23B, and 24B, the conductive patterns 25A, 26A, 25B, and 26B connected to the conductive layers 23A, 24A, 23B, and 24B, and the conductive pads 27A, 28A, 27B, and 28B, as shown in FIGS. 5A and 5B, and by pulling the weight portion 2 toward the substrate 1 side by the electrostatic attractive forces 21A and 22A, as well as by pulling the frame body 36 toward the substrate 1 side by the electrostatic attractive forces 21B and 22B, a similar effect to that of the above-described second embodiment can be achieved. Also in the resonant element 16 having the configuration shown in FIGS. 5A and 5B, by providing the conductive layers 41A, 1B, 42A, and 42B, as shown in FIG. 4C, which are the stress canceling means as described with reference to the above described third embodiment, a similar effect to that of the third embodiment can be exerted.

In the above-described first and second embodiments, the conductive layers 23 and 24 are extended along the sides of both edges of the planar vibrating body 10, but the arrangement may be such that a plural of minute conductive layers are formed so as to be arranged along the sides of both edges of the planar vibrating body 10. In this case, it is preferable that the plurality of minute conductive layers include minute conductive layers opposed to the four corners of the rectangular planar vibrating body 10.

Furthermore, in the above-described second embodiment, although the weight portion 2 performs itself functions as a vertical movement side electrode, another vertical movement side electrode 30 may be provided on at least one of the surface side and the rear side of the weight portion 2. If a vertical movement side electrode 30 is disposed on the surface side of the weight portion 2, for example, in the same state as that shown in FIG. 2D, a cover 32 or the like opposed to the weight portion 2 is provided, and a fixed opposing electrode is disposed on the cover 32 or the like.

In the above-described first embodiment, a vertical movement side electrode 30 may be disposed on the rear surface of the weight portion 2, and a fixed opposing electrode 31 may be disposed at the position opposed to the weight portion 2 above the substrate 1.

Also, in each of the above-described first and second embodiments, the conductive layers 23 and 24 (23A, 23B, 24A, and 24B) each performing the functions of vibrating body tilt correcting means are disposed on the substrate 1, but when the cover 32 covering the planar vibrating body 10 is provided, these conductive layers 23 and 24 (23A, 23B, 24A, and 24B) may be disposed on the cover 32 in place of the substrate. In this case also, as is the case with the above-described embodiments, the conductive layers 23 and 24 are disposed at both edge areas of the planar vibrating body 10. When the conductive layers 23 and 24 (23A, 23B, 24A, and 24B) each performing the functions of vibrating body tilt correcting means are thus disposed on the cover 32, if the conductive layers 41 and 42 which are stress canceling means shown in the above-described third embodiment are provided, these the conductive layers 41 and 42 are disposed so as to be opposed to the substrate 1 with the plane of the substrate 1 interposed so as to sandwich the planar vibrating body 10 between the conductive layers 41 and 42 and the above-mentioned conductive layers 23 and 24.

In the above-described third embodiment, the arrangement is such that forces in a direction such that tensile stresses within the support beams are counteracted, are applied to the support beam 3, but, for example, conductive layers which are stress canceling means may be provided so that electrostatic attractive forces may be directly given to the support beams 3.

In each of the above-described embodiments, the planar vibrating body 10 is a structure fixed at opposite ends, but the planar vibrating body 10 may be constructed by a one-side fixed method (e.g., cantilever method).

Also, in each of the above-described embodiments, the resonant element 16's were described as being used in angular velocity sensors, but the planar vibrating body 10 in accordance with present invention can also be used in other type devices.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A resonant element comprising:

a fixed substrate having a main surface extending in orthogonal X- and Z-directions;

a planar vibrating body connected to the fixed substrate via support beams so as to be vibratable in the X-direction, the planar vibrating body having a resonance frequency and a weight portion which is isolated from the fixed substrate;

an exciter for vibrating the planar vibrating body in the X-direction, and tilt correcting means providing electrostatic forces to said planar vibrating body to adjust the resonance frequency of said planar vibrating body and to correct the tilt of said planar vibrating body with respect to the main surface of said fixed substrate.

2. A resonant element as claimed in claim 1, wherein:

the tilt correcting means is provided at least at opposing edge areas of said planar vibrating body with a gap in the X-direction therebetween and is spaced from said planar vibrating body in a Y-direction orthogonal to said X- and Z-directions.

3. A resonant element as claimed in claim 1, wherein:

said planar vibrating body has a frame body disposed above and isolated from the fixed substrate and wherein the weight portion is connected to the inside of said frame body by connection beams.

4. A resonant element as claimed in claim 1, wherein:

the tilt correcting means comprises a first tilt correcting element and a second tilt correction element, the first tilt correcting element being provided at least at opposing edge areas of said weight portion with a gap in the X-direction therebetween and being spaced from said planar vibrating body in the Y-direction, and the second tilt correcting element is provided at positions opposed to said frame body and across said first vibrating body tilt correcting means via gaps in the X-direction.

5. A resonant element as claimed in any one of claims 1–4, wherein:

stress canceling means are provided for directly or indirectly applying to said support beams forces in a direction such as to counteract any tensile stresses within said support beams caused by electrostatic attractive forces given to said planar vibrating body by said vibrating body tilt correcting means.

6. A resonant element as claimed in claim 5, wherein:

said stress canceling means are provided so as to be opposed to said vibrating body tilt correcting means and so as to sandwich said vibrating body between said stress canceling means and said vibrating body tilt correcting means via gaps.

7. A resonant element as claimed in claim 6, wherein:

said stress canceling means are structured and arranged to cancel the tensile stresses within said support beams by providing electrostatic attractive forces to said vibrating body.

8. A resonant element as claimed in any one of claims 1 through 4, wherein:

a vertical movement side electrode is provided on at least one of a front surface and a rear surface of said weight portion, and a fixed opposing electrode is-disposed on a side opposed to said vertical movement side electrode and spaced from said weight portion in the Y-direction, the set of said vertical movement side electrode and said fixed opposing electrode functioning as a detecting electrode for detecting a vibration amplitude of said weight portion in the Y-direction due to an angular velocity being applied to said vibrating body about the Z-direction, the vibration amplitude corresponding to variation in the angular velocity of the rotation around the Z-axis.

9. A resonant element as claimed in claim 8, wherein:

said stress canceling means are provided so as to be opposed to said vibrating body tilt correcting means and so as to sandwich said vibrating body between said stress canceling means and said vibrating body tilt correcting means via intervals.

10. A resonant element as claimed in claim 9, wherein:

said stress canceling means are structured and arranged to cancel the tensile stresses within said support beams by providing electrostatic attractive forces to said vibrating body.

11. A resonant element as claimed in claim 8, wherein:

said weight portion is formed of silicon or polysilicon, and serves as the movement side electrode.

12. A method for adjusting the vibration of a resonant element comprising the steps of:

providing a resonant element including a fixed substrate having a main surface extending in orthogonal X- and Z-directions, a planar vibrating body fixed via support beams so as to be vibratable in the X-direction, the planar vibrating body having a resonance frequency and a weight portion which is isolated from the fixed substrate; an exciter for vibrating the planar vibrating body in the X-direction, and tilt correcting means providing electrostatic forces to said planar vibrating body to adjust the resonance frequency of said planar vibrating body and to correct the tilt of said planar vibrating body with respect to the main surface of said fixed substrate;

detecting a resonance frequency of said planar vibrating body;

adjusting said resonance frequency to a desired value using said tilt correcting means;

detecting tilt of said planar body with respect to the main surface of said fixed substrate; and correcting the tilt of said planar body with respect to the main surface of said fixed substrate using said tilt correcting means.

13. A method for adjusting the vibration of a resonant element in an angular velocity sensor and then determining angular velocity, comprising:

providing a resonant element including a fixed substrate having a main surface in orthogonal X- and Z-directions, a planar vibrating body fixed via support beams so as to be vibratable in the X-direction, the planar vibrating body having a weight portion which is isolated from the fixed substrate, an exciter for vibrating the planar vibrating body in the X-direction, tilt correcting means for providing electrostatic forces to said planar vibrating body to adjust the resonance frequency of said planar vibrating body and to correct the tilt of said planar vibrating body with respect to the main surface of said fixed substrate, a vertical movement side electrode is on at least one of a front surface and a rear surface of said weight portion, and a fixed opposing electrode is disposed on a side opposed to said vertical movement side electrode and spaced from said weight portion in the Y-direction, the set of said vertical movement side electrode and said fixed opposing electrode functioning as a detecting electrode for detecting a vibration amplitude of said weight portion in the Y-direction due to an angular velocity being applied to said vibrating body about the Z-direction, the vibration amplitude corresponding to variation in the angular velocity of the rotation around the Z-axis;

detecting a resonance frequency of said planar vibrating body;

adjusting said resonance frequency to a desired value using said tilt correcting means;

detecting tilt of said planar body with respect to the main surface of said fixed substrate;

correcting the tilt of said planar body with respect to the main surface of said fixed substrate using said tilt correcting means;

applying an angular velocity to said resonant element about a Y-axis orthogonal to said X- and Z-directions to cause said resonant body to vibrate in the Z-direction due to a Coriolis force; and detecting the vibrating amplitude of said weight portion in the Y-direction using said detecting electrode to determine the angular velocity of the rotation around the Z-axis.

* * * * *